United States Patent [19]

Schisselbauer et al.

[11] 4,117,314
[45] Sep. 26, 1978

[54] CARD READER WITH MEANS FOR UNLOADING OUTPUT HOPPER ON THE FLY

[75] Inventors: John C. Schisselbauer, Southampton; John J. Dobson, Oreland, both of Pa.

[73] Assignee: Peripheral Dynamics, Inc., Norristown, Pa.

[21] Appl. No.: 693,878

[22] Filed: Jun. 8, 1976

[51] Int. Cl.² .................... G06K 13/14; B65H 31/12
[52] U.S. Cl. ................................ 235/475; 271/218
[58] Field of Search ............ 271/220, 169, 218, 157, 271/DIG. 9; 235/61.11 D, 61.11 E, 61.11 A, 61.11 B, 61.11 R

[56] References Cited

U.S. PATENT DOCUMENTS

| | | | |
|---|---|---|---|
| 2,588,190 | 3/1952 | Wockenfuss | 235/61.11 B |
| 2,824,738 | 2/1958 | Buttner | 271/157 |
| 2,973,142 | 2/1961 | Jenner | 235/61.11 C |
| 3,362,707 | 1/1968 | Lauren | 271/218 |
| 3,972,524 | 8/1976 | Despot | 271/218 |

*Primary Examiner*—Robert M. Kilgore

*Attorney, Agent, or Firm*—Woodcock, Washburn, Kurtz & Mackiewicz

[57] ABSTRACT

A card reader having means for receiving cards and transporting them past a read station and into an output hopper, the output hopper being modified to embrace means whereby cards can be unloaded from the output hopper while the machine remains in operation and is feeding cards through the reader and into the output hopper. The primary feature of the embodiment for unloading on the fly is a solenoid-actuated lever mounted on top of the output hopper, having a lever head at one end which when actuated presses against the side of cards in the hopper and clamps at least some of the cards in the hopper between the lever head and a cooperating indentation formed in the opposite side of the hopper, whereby the clamped cards are held in place. A manually operable elevator contains a pressure switch located so that as the operator draws the elevator downward the solenoid is actuated and the cards between the elevator and the lever-clamped cards are freed for easy removal while the cards which are being read during the removal operation are accumulated above the clamped cards.

16 Claims, 7 Drawing Figures

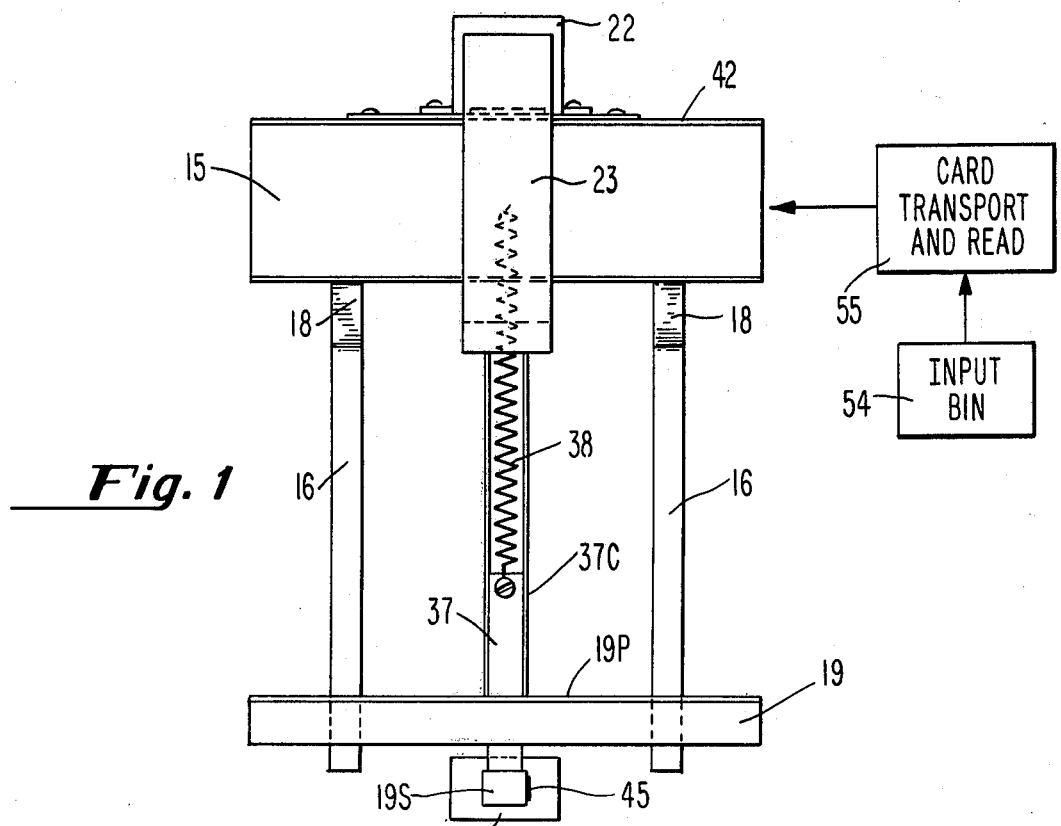
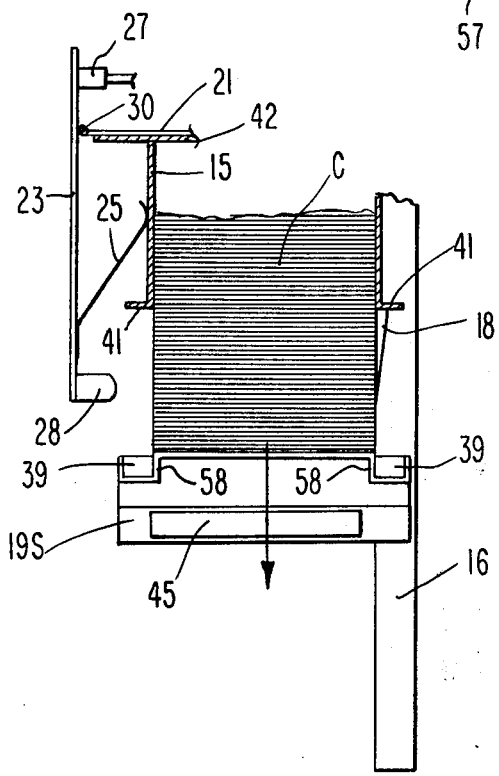
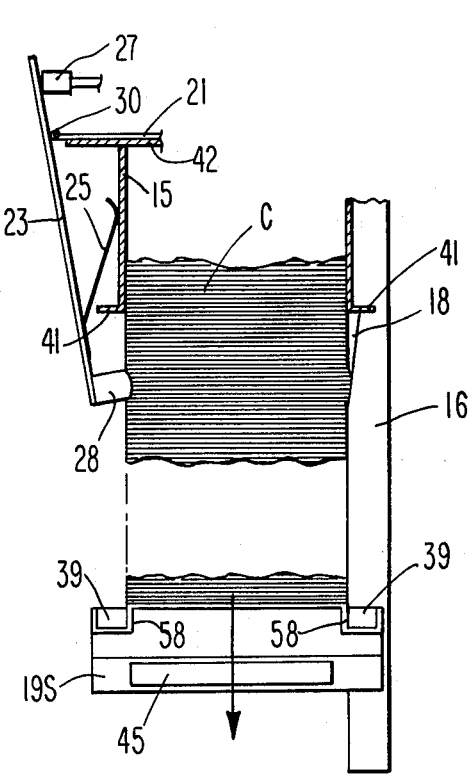

CARD READER WITH MEANS FOR UNLOADING OUTPUT HOPPER ON THE FLY

BACKGROUND OF THE INVENTION

A. Field of the Invention

The invention relates to card reading apparatus for use in electronic data processing systems and, more particularly, relatively high speed card readers designed with input and output hoppers suitable for continuous card reading operation.

B. Description of the Prior Art

The use of card readers in the electronic data processing industry has been widespread for many years, and is well established. Such card readers find use in a wide variety of different systems and applications, and indeed are used in any type of system where paper cards are a suitable means for storing information and inputting information into the system. In accordance with the wide variety of types of electronic data processing systems which are found, card readers are available which have many different speeds, and range from card readers designed to read one card at a time to card readers designed to accommodate large loads, e.g., read 1,000 card per minute or more. In most applications, there occur instances where a large number of cards encoded with information, either mark or hole information, are being read at a reasonably high speed, and the operator is interested in being as efficient as possible in loading and unloading the card reader so as to optimize its usage. The conventional input hopper design of card readers provides for cards to be loaded from the top into a hopper, with the card reader picking or otherwise feeding each successive card from the bottom of the pile. This arrangement permits easy loading of the input hopper without in any way affecting the continuing operation of the card reader. However, the unloading operation presents more of a problem, since the conventional card reader arrangement incorporates an output hopper wherein the cards which have been transported through the reader are dropped into the output bin at high speed, with each successive card being piled on top of the prior card. Since the cards are being loaded from the top, and the pile of cards is being supported from the bottom, there is no ready way of unloading the output hopper, or output bin, while maintaining continuous high speed operation without disturbing the collection of cards in the output hopper. Not only is it desirable to unload cards, but the unloading operation must be non-disturbing in the sense of not disturbing the collection of cards and not causing any damage to any of the cards. In other words, what is needed is a means of "unloading on the fly", which permits the operator to unload cards at any suitable moment, without stopping the operation of the card reader. It is to be noted that card readers conventionally have an automatic shut-off feature, whereby when the pile of cards in the output bin reaches a certain magnitude, a switch is closed resulting in turn-off of the card reader motor. When this happens, of course, the operator can then unload the output bin, and recommence operation. Alternately, the operator can throw a power switch and stop operation, unload the output hopper, and then recommence operation. However, it is clear that, from an operator point of view, it would be greatly desirable to be able to unload on the fly, so that the operator has complete flexibility in loading and unloading while maintaining continuous operation of the card reader, and without damaging the cards. It is readily appreciated that, whether the system that is being attended by the operator involves a single card reader or a number of card readers, the efficiency of operation will be increased by the capability of maintaining continuous operation of each reader. It is well recognized in the data processing industry that the overall system efficiency, from the point of view of time required to perform operations, is limited by the input and output peripheral devices, and accordingly any means of increasing the operating efficiency of the card reader when used as an input device directly enhances the efficiency of the entire system.

As used herein, the term "card" refers to conventional paper cards as used in the data processing industry, of any size, as well as any other type of card, sheet, page and the like on which character information can be encoded.

SUMMARY OF THE INVENTION

It is the primary object of this invention to provide a card reader having efficient means whereby cards which have been passed through the reader and read can be unloaded from the reader without stopping or otherwise altering the card reading operation, and without damage to the cards. The means for providing for such unloading on the fly permit efficient operator intervention to unload cards from the output bin of the reader while the card reader maintains continuous operation.

It is a further object of this invention to provide novel automatic means for enabling unloading on the fly, which means are efficient and easily integrated into card readers during manufacture thereof or attached to existing card readers as auxiliary apparatus.

In accordance with the above objectives, there is provided a card reader having an input bin for holding cards to be read, a transport mechanism for transporting cards through the reader at which time they are read, and an output bin wherein the cards are collected after having been transported through and read in the card reader. The card reader contains means cooperating with the output hopper for enabling efficient unloading while the machine is in operation, i.e., on the fly, the unloading means comprising an elevator supporting cards collected in the output bin, a support mechanism for supporting cards collected in the output bin above a predetermined level, the support mechanism being normally inoperative so that the collected cards descend on the elevator as the pile of collected cards is built up, and an enabling mechanism for enabling the support mechanism so as to render it operable, whereby the cards supported by the elevator and which are below those supported by the support mechanism are free for unloading. The invention features a solenoid actuated lever suitably mounted on top of the output bin, which lever is actuated at the time of unloading and cooperates with a portion of the output bin to clamp at least some of the collected cards with sufficient force to support the cards which are being piled on from above during the continuing operation while the cards below are free for removal.

BRIEF DESCRIPTION OF THE DRAWINGS

FIG. 1 is a diagrammatic front view of a portion of the apparatus of this invention.

FIG. 2 is a diagrammatic side view of a portion of the apparatus of this invention, with the unloading lever in the unactuated position.

FIG. 3 is a diagrammatic side view similar to that of FIG. 2, with the unloading lever in the actuated position.

DESCRIPTION OF THE PREFERRED EMBODIMENT

Figure 4:
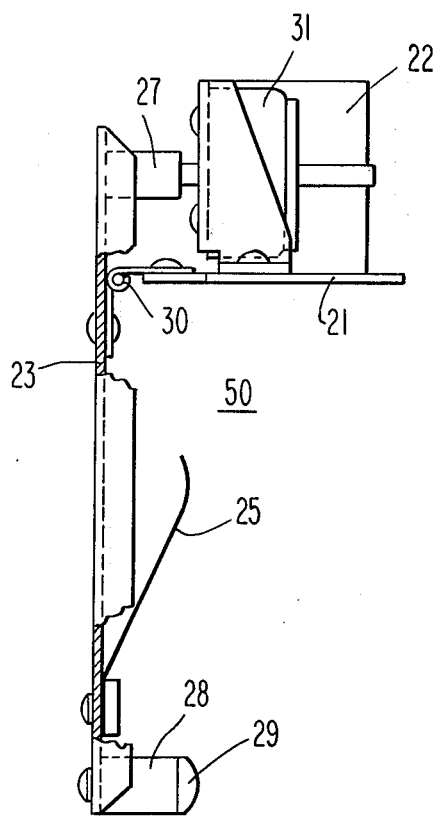
FIG. 4 is a detailed view of the actuator assembly of this invention, as seen from the side when it is mounted on a card reader.
Figure 5:
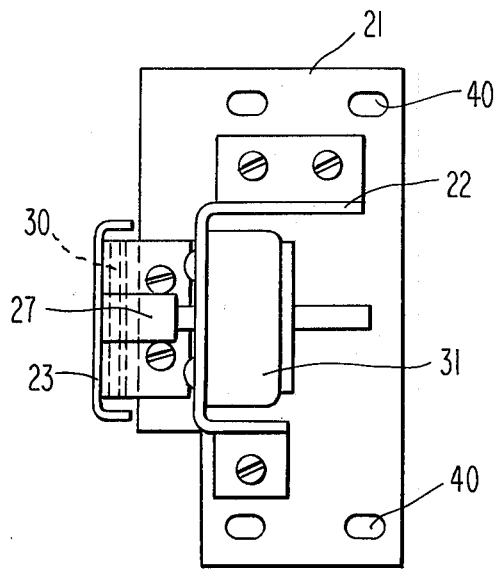
FIG. 5 is a detailed view of the actuator assembly of this invention, as seen from the top when it is mounted on the card reader.

Referring now to FIG. 1, the main features of the assembly permitting unloading of the output hopper on the fly are shown. FIG. 1 is a diagrammatic side view illustration looking at the front of the card reader of the preferred embodiment of this invention. The card reader contains an input bin, designated by block 54, and card transport and read mechanisms, designated by block 55. The input hopper, or bin, the transport mechanism and the read station are of any conventional design. Mounted on the front portion of the housing of the card reader are substantially vertical rails 16 which define the back plane of the output hopper. As seen in FIGS. 2 and 3 as well, elevator 19 supports a pile of cards C, the elevator 19 being normally biased into an upward position by spring 38, or a cable connected to a spring. Spring 38 is suitably connected to the housing at its upper end, and to element 37 at its lower end. Element 37 is connected to the back edge of elevator 19, and is adapted to ride in channel 37C. Element 37 has ball bearings, not shown, which permit it to travel within channel 37C, the element acting to constrain the elevator movement to up and down movement within the channel. The spring tension of spring 38 is adapted so that as the cards are loaded onto the plate, the weight of the cards urges the elevator downward, thereby enabling continuous loading with the cards hitting the pile at substantially the same level. In other words, the weight of the cards balances the spring tension so that the elevator moves downward to accommodate the cards as they are piled onto it.

The output hopper, or bin is defined on the bottom by plate 19P of elevator 19; in the back by rails 16; on the top by plate 42; in the front by shroud 15; and by an end wall not shown opposite the side from which the cards are introduced. In FIG. 1, a card transport mechanism 55 is illustrated as feeding cards into the hopper area from the right, in which case an end wall is suitably located at the far left of the assembly shown in FIG. 1, positioned between front shroud 15 and rails 16. For details of a suitable card transport mechanism, reference is made to U.S. Pat. No. 3,975,010, titled "Card Reader With Improved Picking And Transport Mechanism", and assigned to the same assignee.

Elevator 19 also is indicated as having a support 19S which is mounted centrally below elevator plate 19P, and which runs laterally from front to back. Support 19S is large enough to that an operator can take hold of it manually, so as to pull the elevator 19 down when it is desired to unload. Fixed to one side of support 19S is a pressure switch 45, which is a commercially available switch adapted to provide normally open contacts and to provide closed contacts when manual pressure is applied thereto. Additionally, toward the upper portion of rails 16, just below the lower extremity of shroud 15, the rails are indented with indents 18, the indents being formed by beveling the rail slightly inward, i.e., toward the rear as seen in FIG. 1. Mounted on top of the bin, on top plate 42, is a lever assembly 50 having a hinged lever arm 23. The lower portion of hinged lever 23 extends below the bottom of shroud 15. The lever assembly is actuated by solenoid 31 (FIG. 4), the support plate 22 of which is shown in FIG. 1.

Reference is now made to FIGS. 2-5 inclusive, which illustrate in detail the lever assembly and the manner in which it works to enable unloading on the fly. As indicated, lever 23 is hinged by a hinge 30 which connects lever 23 with base plate 21, which plate in turn is mounted on to top plate 42 of the output bin, suitably by screws through holes 40. Lever 23 is actuated by extension shaft 27, which in turn is driven outward when solenoid 31 is actuated by closing switch 45. The lower end of lever 23 has mounted thereon a block 28 which extends toward the stack of cards C, and which has at its forward tip a bumper piece 29, as is shown in detail in FIG. 4. Bumper 29 is suitably made of rubber or a material with equivalent properties. Lever 23 has attached thereto a spring element 25 positioned to engage the front of shroud 15 and to normally hold lever 23 so that bumper 29 does not come into contact with any of the cards C in the pile of cards resting on elevator plate 19P.

As further seen in FIGS. 2 and 3, elevator 19 suitably contains front and back U-shaped grooves 58 which run longitudinally substantially the length of elevator 19. The grooves are filled with strips 39 of a cushioning material, suitably foam, which, when the elevator is released such that it is drawn vertically upward by spring 38, come into contact with stop flanges 41, the foam material cushioning the sudden stop of the elevator.

Figure 6:
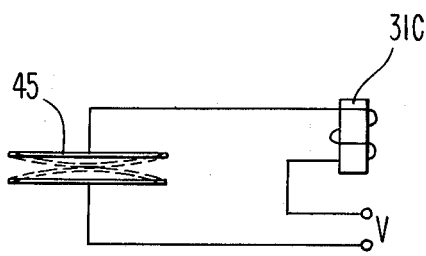
FIG. 6 is a circuit diagram showing the connection of the pressure switch with the solenoid portion of the actuator assembly.

In operation, during normal reading conditions cards are being transported through the card reader and emptied into the bin, piling up on the pile of cards designated C. It is to be noted that at the start of operations, the first card which hits elevator plate 19P does so when the elevator is in its fully upward position, so that such first card is constrained from lateral movement forward by shroud 15. As successive cards are deposited in the bin and elevator 19 drops, the weight of the cards in the growing pile constrains the pile and prevents the cards below the shroud from falling out of the bin. Additionally, it is to be noted that the bin may be tilted backward, and in the preferred embodiment the rails 16 are actually tilted backward off the vertical by about 15°, thereby further ensuring that the cards remain securely in the pile as they are collected in the output bin. During the normal reading operation, the solenoid 31 is unactuated and the lever 23 is in the position as illustrated in FIG. 2, such that it has no effect on the pile of cards. However, when it is desired to unload cards from the output bin, the operator manually takes hold of elevator support 19S, thereby causing the contacts of pressure switch 45 to close, placing the solenoid coil 31C in series with the card reader power supply and actuating solenoid 31. See FIG. 6, which illustrates the electrical circuit comprising pressure sensitive switch 45 and the solenoid coil 31C of solenoid 31. Upon actuation, extension shaft 27 is forced forward and the lever 23 is caused to pivot so that block 28 moves inward, as shown in FIG. 3, the bumper 29 engaging a portion of the cards in the pile C. The dimensions of block 28 and bumper 29 are not critical, but bumper 29 should be large enough so that safe clamping contact is made with at least a plurality of the cards in the pile. As illustrated in FIG. 3, when the lever clamps against at least some of the cards in the pile C, the clamped cards are pushed backwards and into the receiving indent 18. The angled wall of indent 18 provides a rearward support in rearward registry with the bumper, and along with the clamping frictional support of bumper 29, holds the clamped cards in a fixed position. Since the solenoid is actuated substantially at the instant that the operator touches switch 45, the cards in registry with bumper 29 are clamped before elevator 19 is moved downward, such that when the elevator is moved downward it carries with it only the cards below the clamped cards. The clamping force provided by the actuator assembly in combination with the indent is sufficient to support the cards which are piled in the hopper above the clamped cards. It is to be noted that the assembly of this invention provides 3-point suspension in that the clamped cards are held at the point of contact with bumper 29 and at the two indents 18.

In the preferred embodiment, the speed of the card reader is suitably such that additional cards may be fed into the output bin for approximately 15 seconds while the unloading operation is going on. During this time, the operator may reach in, either from the front or from an open side, and remove the cards which are resting in a free state on top of elevator plate 19P. Upon release of the elevator, the elevator rises up and again supports the pile of cards which have been collected above, and the lever assembly is released so that normal output loading operation is resumed. The weight of the cards above cause the indented cards to be worked outward by the effect of the ramps 18 as the cards move downward in the hopper, such that the previously clamped cards are fully released.

In review, the unloading-on-the-fly operation is very simple and very effective. Without shutting off the reader, and while cards are continuously being read and discharged into the output hopper, the operator grasps the elevator support with one hand and pulls it down. This one movement causes all cards at and above the indent level to be held from dropping, while all cards below that level are left in a free pile which the operator easily removes with his or her other hand. During this operation, cards are being discharged into the output hopper, but there is no problem since the pile being formed is completely contained as though the elevator were up at its normal unloaded position.

Figure 7:
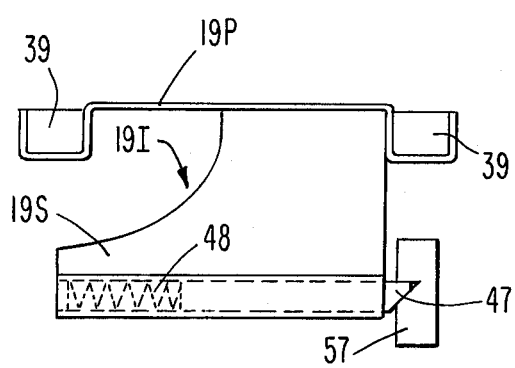
FIG. 7 is a detailed diagrammatic view of an alternate embodiment of the elevator support of this invention.

Referring now to FIG. 7, there is shown an illustrative detailed view of an alternate embodiment of the elevator of this invention. The support 19S is illustrated as having an indentation 19I, of suitable size such that the operator's fingers may easily penetrate into the indentation so that the elevator may be pressed downwardly. In this embodiment, a latch 47 which is acted upon by a spring 48 is provided to engage a latch opening, not shown, in element 57. The purpose of this embodiment is to enable the operator, at his selection, to simply push the elevator down into a latching position for unloading all of the cards in the output bin. This embodiment is useful at the conclusion of the card reading operation, i.e., when the input hopper runs out of cards. At that time, it is desirable to unload the cards remaining in the output hopper without operating the unloading mechanism, so that all the cards will drop down onto the elevator without any being trapped in the shroud. The operator may easily do this by pushing the elevator downward with the fingers, i.e., pressing downward at indentation 19I. When the elevator latches, the cards are easily removed, and since the lever assembly is not actuated, all of the cards are available for removal. A switch, not shown, is suitably positioned to turn off the card reader motor during this unloading operation.

It is to be noted that the lever assembly of this invention is adaptable to be installed on a card reader that is already in the field, i.e., may be attached as a piece of auxiliary equipment. While the preferred embodiment utilizes the lever assembly as disclosed, other means for clamping or pinching cards in the output hopper may be utilized within the scope of this invention. For example, two solenoid-actuated members may be mounted on the bin, one on each side, and actuated together to provide the desired clamping force. This alternate arrangement is illustrative of the basic feature of means for isolating the cards being collected from at least some of those that have already been collected. In holding some of the cards in a fixed position, as by clamping or pinching, the cards below are effectively isolated from the cards which are being piled on from above, and it is this basic isolation feature which permits the easy and safe unloading on the fly.

It is further noted that the assembly of this invention is capable of being incorporated into a card reader designed for completely automatic unloading. Given the means to clamp cards so as to free those below for removal, automatic means for dropping the elevator and removing those cards carried thereon may be employed, thus enlarging the processing capability of the system.

We claim:

1. In a card reader having input means for inputting cards into the reader, transport means for transporting them through said reader so that they can be read, and an output hopper wherein cards are collected after having been read, the output hopper having elevator means for supporting the cards collected in said output hopper and having the feature of being moveable, the invention comprising means enabling efficient unloading of said card reader while it is in continuous operation, said unloading means comprising support means for supporting cards in said output hopper above a predetermined level, said support means being normally inoperative and exerting inward clamping pressure on a plurality of said collected cards, and support enabling means for rendering said support means operable, whereby cards being read while said support means is operative are collected on a pile supported by said supported cards and the cards supported by said elevator below said supported cards are available for unloading.

2. The card reader as described in claim 1, wherein said support means comprises a solenoid actuated lever mounted on said output hopper in registration with a portion of said output hopper so as to cooperate with said portion in clamping opposite edges of at least some of the cards in said hopper when said lever is actuated.

3. The card reader as described in claim 2, wherein said output hopper portion comprises a receiving indentation in position to cooperate with said lever.

4. The card reader as described in claim 3, wherein said output hopper has at least one rail and said rail contains said receiving indentation.

5. The card reader as described in claim 4, wherein said card hopper contains two of said rails, said rails being positioned substantially perpendicular to the supporting surface of said elevator, each of said rails containing an indentation in registry with the lever at the point where said lever clamps said at least some cards, whereby when said lever is actuated said at least some cards are forced by said lever laterally into said indentations.

6. The card reader as described in claim 2, wherein said elevator has mounted thereon actuating means in operative connection with said support means for actuating said lever.

7. The card reader a described in claim 5, wherein said elevator has mounted thereon actuating means in operative connection with said lever for actuating said lever.

8. The card reader as described in claim 6, wherein said actuating means comprises a pressure sensitive switch in electrical circuit with said solenoid actuated lever.

9. The card reader as described in claim 8, wherein said elevator has latching means for latching it in a fixed position.

10. The card reader as described in claim 9, comprising elevator support means for providing a force urging said elevator in an upward direction, said upward direction being in opposition to the downward force exerted on said elevator by cards carried on its surface.

11. Card reader apparatus for reading cards encoded with information, said apparatus adapted for loading and unloading on the fly, comprising:

a. input means for storing cards prior to the reading of said cards by said card reader;
b. transport means for transporting cards from said input means through said card reader;
c. reading means for reading said cards during the transport of same through said card reader;
d. output means for collecting cards which have been transported through said card reader; and
e. isolating means for providing inward clamping pressure upon opposite edge of at least a plurality of said collected cards, whereby said at least some collected cards are available for unloading without affecting the cards being collected by said continuous operation.

12. The apparatus as described in claim 11, comprising means for moving said at least some collected cards relative to said cards being collected.

13. The apparatus as described in claim 11, wherein said output means comprises a restraining surface having an indentation therein and said isolating means comprises actuable pinching means for forcing said plurality of collected cards into said indentation whereby said clamping pressure is exerted between said pinching means and said indentation.

14. The apparatus as described in claim 13, wherein said indentation comprises a ramp surface.

15. The apparatus as described in claim 14, wherein said restraining surface is tilted from the vertical.

16. The apparatus as described in claim 14, wherein said output means comprises an elevator having a support surface and said restraining surface comprises at least one rail substantially perpendicular to said support surface.

* * * * *